United States Patent
Fu et al.

(10) Patent No.: US 11,492,680 B2
(45) Date of Patent: Nov. 8, 2022

(54) WATER SPRAY SYSTEM FOR HEAT TREATMENT OF METAL PLATE STRIPS AND CONTROL METHOD

(71) Applicant: NORTHEASTERN UNIVERSITY, Liaoning (CN)

(72) Inventors: Tianliang Fu, Liaoning (CN); Guozhi Song, Liaoning (CN); Junguo Gao, Liaoning (CN); Yanqi Ye, Liaoning (CN); Zhiwei Jia, Liaoning (CN); Lin Su, Liaoning (CN); Guanghao Liu, Liaoning (CN)

(73) Assignee: NORTHEASTERN UNIVERSITY, Liaoning (CN)

( * ) Notice: Subject to any disclaimer, the term of this patent is extended or adjusted under 35 U.S.C. 154(b) by 0 days.

(21) Appl. No.: 17/371,949

(22) Filed: Jul. 9, 2021

(65) Prior Publication Data
US 2022/0017988 A1    Jan. 20, 2022

(30) Foreign Application Priority Data
Jul. 14, 2020 (CN) .......................... 202010675858.3

(51) Int. Cl.
*C21D 11/00* (2006.01)
*C21D 1/667* (2006.01)
*C21D 9/52* (2006.01)

(52) U.S. Cl.
CPC ............ *C21D 11/005* (2013.01); *C21D 1/667* (2013.01); *C21D 9/52* (2013.01)

(58) Field of Classification Search
CPC ........ C21D 11/005; C21D 1/667; C21D 9/52; C21D 9/573
See application file for complete search history.

(56) References Cited

FOREIGN PATENT DOCUMENTS

| CN | 201447494 U | 5/2010 |
| CN | 202030785 U | 11/2011 |
| CN | 103861879 A | * 6/2014 |

OTHER PUBLICATIONS

Office Action (with English translation) corresponding to Chinese application No. 202010675858.3 dated Mar. 31, 2021. (pp. 9).
Notification of Grant (with English translation) corresponding to Chinese application No. 202010675858.3 dated Jun. 22, 2021. (pp. 4).

* cited by examiner

*Primary Examiner* — Rebecca Janssen
(74) *Attorney, Agent, or Firm* — Muncy, Geissler, Olds & Lowe, P.C.

(57) ABSTRACT

The present invention belongs to the field of heat treatment for metal plate strips, and discloses a water spray system for heat treatment of metal plate strips and a control method. The system comprises a shunt water collector, sub-water supply pipelines, a control valve group and a control system. The control method comprises a water pressure regulating method and a water flow regulating method. The shunt water collector adopts multi-pipeline uniform flow design and realizes uniform shunt and constant pressure water supply. The sub-water supply pipelines are designed with three configuration modes of a control valve group in accordance with varieties and specifications of metal plate strips, rhythms of production and heat treatment technologies to realize dual closed-loop control of water pressure-water flow.

1 Claim, 2 Drawing Sheets

WATER SPRAY SYSTEM FOR HEAT TREATMENT OF METAL PLATE STRIPS AND CONTROL METHOD

TECHNICAL FIELD

The present invention belongs to the field of heat treatment for metal plate strips, and relates to a water spray system for heat treatment of metal plate strips and a control method.

BACKGROUND

Heat treatment is a key technology to improve the comprehensive properties of metal plate strips, and has obvious effects especially in improving strength and toughness, corrosion resistance, high temperature performance, fatigue performance and processing performance. There are many types of metal plate strips for heat treatment (such as ordinary carbon structural steel, stainless steel, aluminum alloy, titanium alloy and superalloy), with large specification span (thickness of 2-300 mm and width of 800-5000 mm), and complex heat treatment technologies (such as normalization, tempering, solid solution, quenching, controlled cooling and weak water cooling).

Cooling is an important link of the heat treatment technologies of the metal plate strips. By designing and controlling different cooling paths, the microstructure of the metal plate strips can be significantly improved to obtain better properties. Generally, water or aqueous solution is used as a cooling medium for the cooling and heat treatment of the metal plate strips. Through the characteristics of low cost, easy acquirement, no toxicity, no combustion, stable physical and chemical properties and strong cooling ability, different cooling systems are realized to satisfy the needs of different heat treatment technologies. At present, the heat treatment of the metal plate strips is developed towards refinement, complexity, high efficiency and low energy consumption, and puts forward higher requirements for valve configuration of the water spray system, the accurate control and rapid response of water spray parameters, scientific and reasonable water spray control, and accurate and reliable automatic water spray systems. The practical problems of the existing water spray system for heat treatment and cooling of the metal plate strips such as low accuracy, long adjustment time, large leakage amount and low automation degree need to be solved urgently.

In the existing patents, the Chinese patent application (publication number CN201447494U) discloses a water spray system for a high temperature rapid quenching device of a seamless steel tube, comprising three groups of water spray devices, and each group of water spray device is respectively provided with a control valve. The control valves only provide opening and closing functions, cannot accurately regulate the flow and pressure, and are irrelevant to the design solution of the present invention.

The Chinese patent application (publication number CN202030785U) discloses a cooling device suitable for a dual-frequency surface quenching device, which is successively connected with a pool, a water supply pump, a control valve and a water sprayer through pipelines. The water spray control system of the cooling device can only complete the on-off control of cooling water, and does not provide the function of controlling the flow and pressure of the cooling water. The system only provides one group of control valve, cannot realize the functions of complex multi-nozzle opening and closing and flow regulation, and is irrelevant to the design solution of the present invention.

SUMMARY

With respect to the problems of low control accuracy, long adjustment time and low automation degree in the existing water spray system for cooling and heat treatment of metal plate strips, the purpose of the present invention is to provide a water spray system for heat treatment of metal plate strips and a control method. The system and the method can effectively improve the control accuracy and adjustment speed of water spray process parameters in the cooling and heat treatment process of metal plate strips, reduce pipeline vibration, save water and energy, and achieve the objective of automatic production of multi-variety, multi-specification and complex heat treatment technologies.

The technical solution of the present invention is as follows:

A water spray system for heat treatment of metal plate strips comprises a shunt water collector, sub-water supply pipelines, a control valve group and a control system. One end of the system is connected with a main water supply pipeline and the other end is connected with jet nozzles.

The shunt water collector is composed of two horizontal or vertical cylindrical pipelines which are respectively used as a water inlet pipeline and a water outlet pipeline; the water inlet pipeline is connected with the main water supply pipeline at an end or side surface; the water outlet pipeline is connected with the water inlet pipeline through a middle pipeline with a distance of 1-2 m; a plurality of groups of sub-water supply pipelines are connected into the water outlet pipeline laterally or upwards; the water inlet pipeline and the water outlet pipeline are respectively provided with manholes; the water outlet pipeline is provided with a water pressure sensor and a water temperature sensor; the upper end of the water outlet pipeline is provided with an exhaust pipeline; the water inlet pipeline and the water outlet pipeline are respectively provided with bypass pipelines at a bottom end or both ends; and pneumatic regulating valves are arranged on the bypass pipelines.

The sub-water supply pipelines are composed of a plurality of groups of horizontal water supply pipelines; the control valve group on the sub-water supply pipelines comprises a maintenance valve, a flexible coupling, a conical filter, an electromagnetic flowmeter, a pneumatic opening and closing valve, a pneumatic regulating valve or an electric regulating valve; the control valve group comprises three modes:

mode 1: the maintenance valve, the flexible coupling, the conical filter, the electromagnetic flowmeter, the pneumatic regulating valve and the jet nozzles are connected in sequence, which is suitable for a heat treatment line of continuous quenching of plate strips with a single batch ⩽10 blocks and a production specification ⩾8 types/day or production frequency ⩾10 blocks/hour;

mode 2: the maintenance valve, the flexible coupling, the conical filter, the pneumatic opening and closing valve, the electromagnetic flowmeter, the pneumatic regulating valve and the jet nozzles are connected in sequence, which is suitable for a heat treatment line of quenching and tempering mixture of plate strips with a single batch ⩽10 blocks and a production specification ⩾8 types/day or steel tapping frequency ⩾10 blocks/hour;

mode 3: the maintenance valve, the flexible coupling, the conical filter, the pneumatic opening and closing valve, the electromagnetic flowmeter, the pneumatic regulating valve and the jet nozzles are connected in sequence, which is suitable for a heat treatment line of large-batch and single-specification quenching or quenching+tempering of plate strips with a single batch >10 blocks and a production specification <8 types/day or production frequency <10 blocks/hour.

The control system feeds back water pressure through the water pressure sensor, feeds back water temperature through the water temperature sensor, and feeds back water flow through the electromagnetic flowmeter of the sub-water supply pipelines; and a detection instrument signal controls the opening and closing of the pneumatic opening and closing valve of the sub-water supply pipelines, and the opening adjustment of the pneumatic regulating valve or the electric regulating valve of the bypass pipeline and the sub-water supply pipelines through a PLC system to achieve different water spray technologies.

A water spray control method for heat treatment of metal plate strips for the above system comprises a water pressure regulating method and a water flow regulating method.

The water pressure regulating method regulates the pneumatic regulating valve of the bypass pipeline through the control system based on the actual water pressure fed back by the water pressure sensor of the shunt water collector to implement closed-loop control of the water pressure; when the actual water pressure—set water pressure $\geqslant 0.05$ MPa, the opening degree of the pneumatic regulating valve of the bypass pipeline is increased; and when the set water pressure—the actual water pressure $\geqslant 0.05$ MPa, the opening degree of the pneumatic regulating valve of the bypass pipeline is decreased.

The water flow regulating method provides three methods according to the control valve group mode of the sub-water supply pipelines:

method 1: for the control valve group mode 1, when the water spray system receives a water spray signal, selecting and adjusting the pneumatic regulating valve of the opened sub-water supply pipeline to a set valve opening, wherein the set valve opening is a valve opening corresponding to a target flow according to a known correlation of flow-opening of the pneumatic regulating valve; when the actual water pressure—the set water pressure $\leqslant \pm 0.05$ MPa, the control system implements the closed-loop control of the water flow according to the water flow fed back by the electromagnetic flowmeter to finely regulate the opening of the pneumatic regulating valve; and when the actual water flow of each opened sub-water supply pipeline—the set water flow $\leqslant \pm 8$ m$^3$/h, the regulation of the water flow is completed;

method 2: for the control valve group mode 2, when the water spray system receives a water spray signal, selecting and adjusting the pneumatic regulating valve of the opened sub-water supply pipeline to a set valve opening, wherein the set valve opening is a valve opening corresponding to a target flow according to a known correlation of flow-opening of the pneumatic regulating valve; the pneumatic opening and closing valve of the opened sub-water supply pipeline is selected and opened; when the actual water pressure—the set water pressure $\leqslant \pm 0.05$ MPa, the control system implements the closed-loop control of the water flow according to the water flow fed back by the electromagnetic flowmeter to finely regulate the opening of the pneumatic regulating valve; and when the actual water flow of each opened sub-water supply pipeline—the set water flow $\leqslant \pm 5$ m$^3$/h, the regulation of the water flow is completed;

method 3: for the control valve group mode 3, when the water spray system receives a water spray signal, selecting and adjusting the electric regulating valve of the opened sub-water supply pipeline to a set valve opening, wherein the set valve opening is a valve opening corresponding to a target flow according to a known correlation of flow-opening of the electric regulating valve; the pneumatic opening and closing valve of the opened sub-water supply pipeline is selected and opened; when the actual water pressure—the set water pressure $\leqslant \pm 0.05$ MPa, the control system implements the closed-loop control of the water flow according to the water flow fed back by the electromagnetic flowmeter to finely regulate the opening of the electric regulating valve; and when the actual water flow of each opened sub-water supply pipeline—the set water flow $\leqslant \pm 3$ m$^3$/h, the regulation of the water flow is completed.

The present invention has the following advantages and beneficial effects:

1. The shunt water collector is designed with two water collectors, i.e., the water inlet pipeline and the water outlet pipeline; through the design of uniform flow, the water supply pressure fluctuation can be reduced effectively, and uniform water distribution of each sub-water supply pipeline can be realized; the shunt water collector is designed with the exhaust pipeline to reduce the gas-liquid mixing phenomenon in the pipeline to achieve continuous and uniform water spray of the jet nozzles; and the shunt water collector is designed with the bypass pipeline to effectively realize the functions of water pressure regulation, removal of sundries in the pipeline and emptying for maintenance.

2. The sub-water supply pipelines provide three design modes of the control valve group according to production requirements for different heat treatment lines to satisfy the demands of product structures, production rhythms and production modes of ① the heat treatment lines of small-batch, multi-specification, fast-rhythm and continuous quenching, ② heat treatment lines of small-batch, multi-specification and fast-rhythm quenching and tempering mixture and ③ heat treatment lines of large-batch and single-specification quenching or quenching+tempering.

3. The water pressure of the water spray system can be effectively controlled based on the closed-loop regulation of the water pressure by the control system and in combination with the frequency conversion control of a water supply system, with high control accuracy, good stability, short regulation time, water conservation, energy conservation and improvement of production efficiency.

4. Different water flow regulation methods of the water spray system are implemented according to different design modes of the control valve group, to realize short water flow regulation time, high regulation accuracy and small pipeline vibration and impact and satisfy the demands of high-accuracy, rapid-response and stable water spray under different specifications, production rhythms and heat treatment modes.

In the figures: 1 water spray system; 2 shunt water collector; 3 sub-water supply pipeline; 4 control valve group; 5 control system; 6 main water supply pipeline; 7 jet nozzle; 8 water inlet pipeline; 9 water outlet pipeline; 10 middle pipeline; 11 manhole; 12 water pressure sensor; 13 water temperature sensor; 14 exhaust pipeline; 15 bypass pipeline; 16 maintenance valve; 17 flexible coupling; 18 conical filter; 19 electromagnetic flowmeter; 20 pneumatic opening and closing valve; 21 pneumatic regulating valve; 22 electric regulating valve; 23 PLC system.

DETAILED DESCRIPTION

A water spray system for heat treatment of metal plate strips and a control method are described below with reference to FIGS. 1-3.

Embodiment 1

Figure 1:
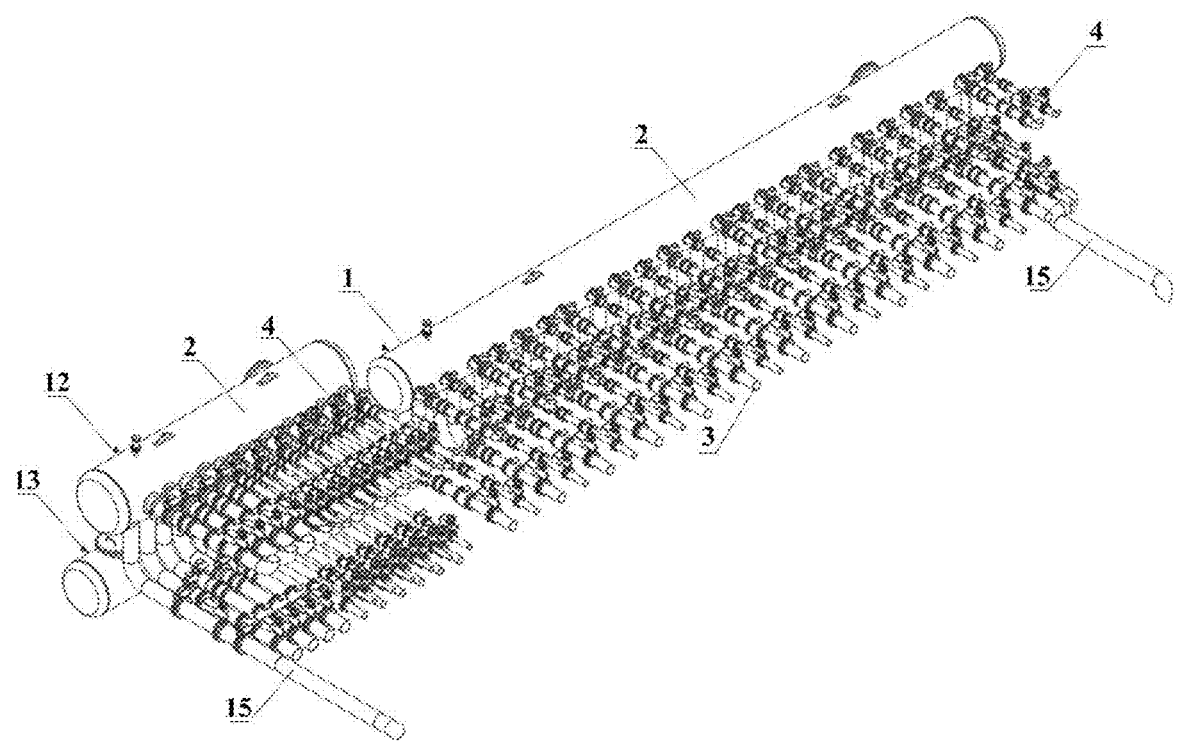
FIG. 1 is a structural schematic diagram of a water spray system for heat treatment of metal plate strips in the present invention.
Figure 2:
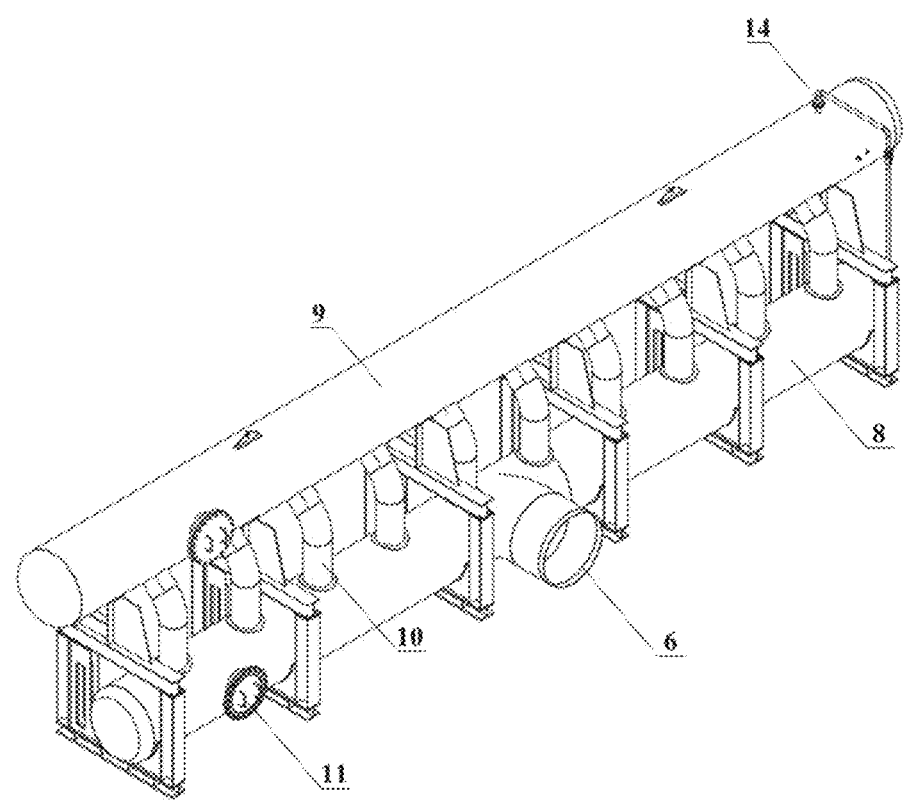
FIG. 2 is a schematic diagram of a shunt water collector of a water spray system for heat treatment of metal plate strips in the present invention.
Figure 3:
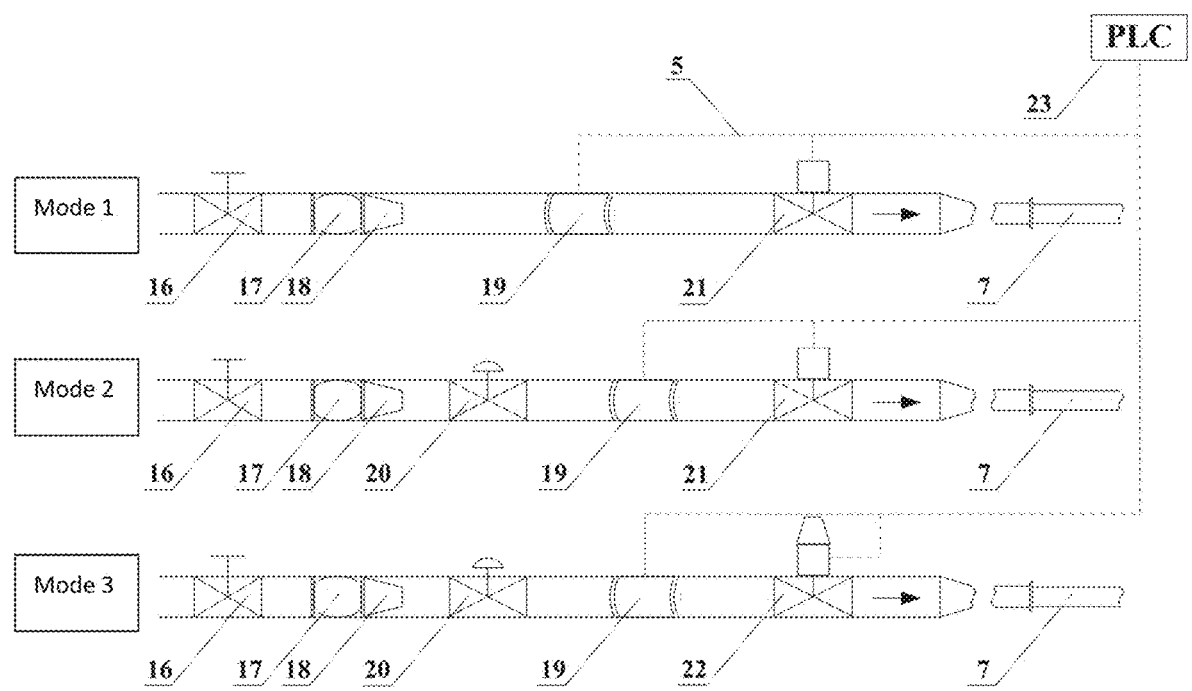
FIG. 3 is a schematic diagram of a control valve group and a control system of a water spray system for heat treatment of metal plate strips in the present invention.

In the present embodiment, taking a heat treatment production mode (mode 1) of small-batch, multi-specification, fast-rhythm and continuous quenching of metal plate strips with the specification range of thickness of 2-100 mm, width of 1000-5000 mm and length of 4-26 m as an example, a specific implementation solution of the water spray system for heat treatment of metal plate strips and the control method is illustrated:

As shown in FIGS. 1-3, when the water spray system 1 for heat treatment of metal plate strips does not receive a water spray signal, cooling water of certain flow, pressure and temperature enters a water inlet pipeline 8 of a shunt water collector 2 from a main water supply pipeline 6, is uniformed shunted through a middle pipeline 10 and enters a water outlet pipeline 9. A water pressure sensor 12 feeds back actual water pressure into a PLC system 23 of a control system 5; and the PLC system 23 controls the opening of a pneumatic regulating valve 21 of a bypass pipeline 15 at the end of the water outlet pipeline 9 to achieve the set technological water spray pressure and maintain the pressure. When the actual water pressure—set water pressure $\leqslant \pm 0.05$ MPa, the opening of the pneumatic regulating valve 21 of the bypass pipeline 15 is not regulated. A water temperature sensor 13 feeds back actual water temperature into the PLC system 23 of the control system 5 to participate in the calculation of a heat transfer model of the water spray system 1. At this moment, the opening of the pneumatic regulating valve 21 in the control valve group 4 of each sub-water supply pipeline 3 is maintained at zero position and a maintenance valve 16 is opened so that water is not sprayed from each sub-water supply pipeline 3 to jet nozzles 7.

When the water spray system 1 receives a water spray signal, according to heat treatment technological procedures, the pneumatic regulating valve 21 of the opened sub-water supply pipeline 3 is selected and rapidly opened to corresponding valve opening according to a predetermined correlation of flow-valve opening; cooling water enters the opened sub-water supply pipeline 3 through the water outlet pipeline 9 of the shunt water collector 2, and enters multiple types of jet nozzles 7 successively through the maintenance valve 16, a flexible coupling 17, a conical filter 18, an electromagnetic flowmeter 19 and a pneumatic regulating valve 21. The cooling water is sprayed by the jet nozzles 7. At this moment, the PLC system 23 of the control system 5 regulates the opening of the pneumatic regulating valve 21 of the bypass pipeline 15 continuously in accordance with the actual water pressure fed back by the water pressure sensor 12; when the actual water pressure—the set water pressure $\leqslant \pm 0.05$ MPa, the PLC system 23 of the control system 5 implements the closed-loop control of the water flow according to the actual water flow fed back by the electromagnetic flowmeter 19 of the opened sub-water supply pipeline 3 to finely regulate the opening of the pneumatic regulating valve 21 of the sub-water supply pipeline 3; and when the actual water flow of each opened sub-water supply pipeline 3—the set water flow $\leqslant \pm 8$ m³/h, the regulation of the water flow is completed; and the cooling of the metal plate strips is started. In the cooling process, the PLC system 23 of the control system 5 always regulates the opening of the pneumatic regulating valve 21 of the bypass pipeline 15 in accordance with the actual water pressure fed back by the water pressure sensor 12 and regulates the opening of the pneumatic regulating valve 21 of the sub-water supply pipeline 3 in accordance with the actual water flow fed back by the electromagnetic flowmeter 19 to maintain the change of technological water pressure and water flow within permitted ranges.

When the water spray system 1 receives a water spray stop signal, the opening of the pneumatic regulating valve 21 of the sub-water supply pipeline 3 is successively returned to zero position; water spray is stopped from the sub-water supply pipeline 3 to the jet nozzles 7; the PLC system 23 of the control system 5 regulates the opening of the pneumatic regulating valve 21 of the bypass pipeline 15 in accordance with the actual water pressure fed back by the water pressure sensor 12; and when the actual water pressure—set water pressure $\leqslant \pm 0.05$ MPa, the pneumatic regulating valve 21 of the bypass pipeline 15 is not regulated.

Embodiment 2

In the present embodiment, taking a heat treatment production mode (mode 3) of large-batch, single-specification and continuous quenching or quenching/tempering mixture of metal plate strips with the specification range of thickness of 2-100 mm, width of 1000-5000 mm and length of 4-26 m as an example, a specific implementation solution of the water spray system for heat treatment of metal plate strips and the control method is illustrated:

As shown in FIGS. 1-3, when the water spray system 1 for heat treatment of metal plate strips does not receive a water spray signal, the implementation solution is the same as that of embodiment 1. At this moment, the pneumatic opening and closing valve 20 in the control valve group 4 of each sub-water supply pipeline 3 is closed; the opening of the electric regulating valve 22 is maintained at the final opening of the previous opening time; the maintenance valve 16 is opened; and water is not sprayed from each sub-water supply pipeline 3 to jet nozzles 7.

When the water spray system 1 receives a water spray signal, according to heat treatment technological procedures, the electric regulating valve 22 of the opened sub-water supply pipeline 3 is selected and opened to corresponding valve opening according to a predetermined correlation of flow-valve opening; then, the pneumatic opening and closing valve 20 of the opened sub-water supply pipeline 3 is selected and opened; cooling water enters the opened sub-water supply pipeline 3 through the water outlet pipeline 9 of the shunt water collector 2, and enters multiple types of jet nozzles 7 successively through the maintenance valve 16, a flexible coupling 17, a conical filter 18, the pneumatic opening and closing valve 20, an electromagnetic flowmeter 19 and the electric regulating valve 22. The cooling water is sprayed by the jet nozzles 7. At this moment, the PLC system 23 of the control system 5 regulates the opening of the pneumatic regulating valve 21 of the bypass pipeline 15 continuously in accordance with the actual water pressure fed back by the water pressure sensor 12; when the actual water pressure—the set water pressure ≤±0.05 MPa, the PLC system 23 of the control system 5 implements the closed-loop control of the water flow according to the actual water flow fed back by the electromagnetic flowmeter 19 of the opened sub-water supply pipeline 3 to finely regulate the opening of the electric regulating valve 22 of the sub-water supply pipeline 3; and when the actual water flow of each opened sub-water supply pipeline 3—the set water flow ≤±3 m³/h, the regulation of the water flow is completed; and the cooling of the metal plate strips is started. In the cooling process, the PLC system 23 of the control system 5 always regulates the opening of the pneumatic regulating valve 21 of the bypass pipeline 15 in accordance with the actual water pressure fed back by the water pressure sensor 12 and regulates the opening of the electric regulating valve 22 of the sub-water supply pipeline 3 in accordance with the actual water flow fed back by the electromagnetic flowmeter 19 to maintain the change of technological water pressure and water flow within permitted ranges.

When the water spray system 1 receives a water spray stop signal, the pneumatic opening and closing valve 20 of the sub-water supply pipeline 3 is closed; the opening of the electric regulating valve 22 is unchanged; and water spray is stopped from the sub-water supply pipeline 3 to the jet nozzles 7. The PLC system 23 of the control system 5 regulates the opening of the pneumatic regulating valve 21 of the bypass pipeline 15 in accordance with the actual water pressure fed back by the water pressure sensor 12; and when the actual water pressure—set water pressure ≤±0.05 MPa, the pneumatic regulating valve 21 of the bypass pipeline 15 is not regulated.

Embodiment 3

In the present embodiment, taking a water spray system in a non-operating state as an example, a specific implementation solution of the water spray system for heat treatment of metal plate strips in a maintenance process is illustrated:

As shown in FIGS. 1-3, when the water spray system 1 for heat treatment of metal plate strips is in the non-operating state, the main water supply pipeline 6 stops supplying water, and the opening of the pneumatic regulating valve 21 of the bypass pipeline 15 is adjusted to a full open position. The maintenance valves 16 of all the sub-water supply pipelines 3 are closed, and the cooling water in the shunt water collector 2 is emptied. The conical filter 18 is removed to inspect and clean blockage, and the manholes 11 of the shunt water collector 2 are removed to inspect and clean impurities and blockage in the shunt water collector 2. Before reuse, the opening of the pneumatic regulating valve 21 of the bypass pipeline 15 is adjusted to the full open position. The maintenance valves 16 of all the sub-water supply pipelines 3 are closed; the exhaust pipeline 14 of the shunt water collector 2 is opened; and the cooling water of certain flow, pressure and temperature enters the shunt water collector 2 from the main water supply pipeline 6. The gas in the pipeline is discharged from the exhaust pipeline 14, and the residual impurities in the pipeline are washed away by the bypass pipeline 15. Then, the maintenance valves 16 of all the sub-water supply pipelines 3 are opened, and the water spray system 1 reaches the operating state.

The results show that the present invention solves the problem of rapid and accurate adjustment of the water flow and pressure of the jet nozzles for the metal plate strips of different specifications and different varieties under different heat treatment process conditions, realizes automatic production, achieves the objectives of increasing production efficiency and saving water and energy, and significantly improves the control accuracy of the heat treatment technologies of the metal plate strips.

The invention claimed is:
1. A water spray control method for heat treatment of metal plate strips, which is realized based on a water spray system for heat treatment of metal plate strips, comprising a shunt water collector (2), sub-water supply pipelines (3), a control valve group (4) and a control system (5), wherein one end of the system is connected with a main water supply pipeline (6) and the other end is connected with jet nozzles (7);

the shunt water collector (2) is composed of two horizontal or vertical cylindrical pipelines which are respectively used as a water inlet pipeline (8) and a water outlet pipeline (9); the water inlet pipeline (8) is connected with the main water supply pipeline (6) at an end or side surface; the water outlet pipeline (9) is connected with the water inlet pipeline (8) through a middle pipeline (10) with a distance of 1-2 m; a plurality of groups of sub-water supply pipelines (3) are connected into the water outlet pipeline (9) laterally or upwards; the water inlet pipeline (8) and the water outlet pipeline (9) are respectively provided with manholes (11); the water outlet pipeline (9) is provided with a water pressure sensor (12) and a water temperature sensor (13); the upper end of the water outlet pipeline (9) is provided with an exhaust pipeline (14); the water inlet pipeline (8) and the water outlet pipeline (9) are respectively provided with bypass pipelines (15) at a bottom end or both ends; and pneumatic regulating valves (21) are arranged on the bypass pipelines;

the sub-water supply pipelines (3) are composed of a plurality of groups of horizontal water supply pipelines; the control valve group (4) on the sub-water supply pipelines comprises a maintenance valve (16), a flexible coupling (17), a conical filter (18), an electromagnetic flowmeter (19), a pneumatic opening and closing valve (20), a pneumatic regulating valve (21) or an electric regulating valve (22); the control valve group (4) comprises three modes:

mode 1: the maintenance valve, the flexible coupling, the conical filter, the electromagnetic flowmeter, the pneumatic regulating valve and the jet nozzles are connected in sequence, which is suitable for a heat treatment line of continuous quenching of plate strips with a single batch ≤10 blocks and a production specification ≥>8 types/day or production frequency ≥10 blocks/hour;

mode 2: the maintenance valve, the flexible coupling, the conical filter, the pneumatic opening and closing valve, the electromagnetic flowmeter, the pneumatic regulating valve and the jet nozzles are connected in sequence, which is suitable for a heat treatment line of quenching and tempering mixture of plate strips with a single batch ≤10 blocks and a production specification ≥8 types/day or steel tapping frequency ≥10 blocks/hour;

mode 3: the maintenance valve, the flexible coupling, the conical filter, the pneumatic opening and closing valve, the electromagnetic flowmeter, the pneumatic regulating valve and the jet nozzles are connected in sequence, which is suitable for a heat treatment line of large-batch and single-specification quenching or quenching+tempering of plate strips with a single batch >10 blocks and a production specification <8 types/day or production frequency <10 blocks/hour.

the control system (5) feeds back water pressure through the water pressure sensor (12), feeds back water temperature through the water temperature sensor (13), and feeds back water flow through the electromagnetic flowmeter (19) of the sub-water supply pipelines; and a detection instrument signal controls the opening and closing of the pneumatic opening and closing valve (20) of the sub-water supply pipelines, and the opening adjustment of the pneumatic regulating valve (21) or the electric regulating valve (22) of the bypass pipeline and the sub-water supply pipelines through a PLC system (23) to achieve different water spray technologies;

the water spray control method for heat treatment of metal plate strips comprises a water pressure regulating method and a water flow regulating method;

the water pressure regulating method regulates the pneumatic regulating valve (21) of the bypass pipeline (15) through the control system (5) based on the actual water pressure fed back by the water pressure sensor (12) of the shunt water collector (2) to implement closed-loop control of the water pressure; when the actual water pressure—set water pressure $\geqslant 0.05$ MPa, the opening degree of the pneumatic regulating valve (21) of the bypass pipeline (15) is increased; and when the set water pressure—the actual water pressure $\geqslant 0.05$ MPa, the opening degree of the pneumatic regulating valve (21) of the bypass pipeline (15) is decreased;

the water flow regulating method provides three methods according to the control valve group mode of the sub-water supply pipelines (3):

method 1: for the control valve group mode 1, when the water spray system (1) receives a water spray signal, selecting and adjusting the pneumatic regulating valve (21) of the opened sub-water supply pipeline (3) to a set valve opening, wherein the set valve opening is a valve opening corresponding to a target flow according to a known correlation of flow-opening of the pneumatic regulating valve; when the actual water pressure—the set water pressure $\leqslant \pm 0.05$ MPa, the control system implements the closed-loop control of the water flow according to the water flow fed back by the electromagnetic flowmeter to finely regulate the opening of the pneumatic regulating valve; and when the actual water flow of each opened sub-water supply pipeline—the set water flow $\leqslant \pm 8$ m$^3$/h, the regulation of the water flow is completed;

method 2: for the control valve group mode 2, when the water spray system (1) receives a water spray signal, selecting and adjusting the pneumatic regulating valve (21) of the opened sub-water supply pipeline (3) to a set valve opening, wherein the set valve opening is a valve opening corresponding to a target flow according to a known correlation of flow-opening of the pneumatic regulating valve; the pneumatic opening and closing valve (20) of the opened sub-water supply pipeline is selected and opened; when the actual water pressure—the set water pressure $\leqslant \pm 0.05$ MPa, the control system implements the closed-loop control of the water flow according to the water flow fed back by the electromagnetic flowmeter to finely regulate the opening of the pneumatic regulating valve; and when the actual water flow of each opened sub-water supply pipeline—the set water flow $\leqslant \pm 5$ m$^3$/h, the regulation of the water flow is completed;

method 3: for the control valve group mode 3, when the water spray system (1) receives a water spray signal, selecting and adjusting the electric regulating valve (22) of the opened sub-water supply pipeline to a set valve opening, wherein the set valve opening is a valve opening corresponding to a target flow according to a known correlation of flow-opening of the electric regulating valve; the pneumatic opening and closing valve (20) of the opened sub-water supply pipeline (3) is selected and opened; when the actual water pressure—the set water pressure $\leqslant \pm 0.05$ MPa, the control system implements the closed-loop control of the water flow according to the water flow fed back by the electromagnetic flowmeter to finely regulate the opening of the electric regulating valve; and when the actual water flow of each opened sub-water supply pipeline—the set water flow $\leqslant \pm 3$ m$^3$/h, the regulation of the water flow is completed.

* * * * *